United States Patent [19]

Nakamichi et al.

[11] 4,316,226

[45] Feb. 16, 1982

[54] HEAD ADJUSTMENT MEANS FOR A TAPE RECORDER

[75] Inventors: Niro Nakamichi, Higashikurume; Hideo Kawachi, Ichikawa, both of Japan

[73] Assignee: Nakamichi Corporation, Tokyo, Japan

[21] Appl. No.: 107,422

[22] Filed: Dec. 26, 1979

[30] Foreign Application Priority Data

Dec. 26, 1978 [JP] Japan .......................... 53/181083[U]

[51] Int. Cl.³ .......................... G11B 5/56; G11B 5/48; G11B 21/24
[52] U.S. Cl. ........................................ 360/109; 360/76
[58] Field of Search ........................... 360/109, 104, 76; 74/428 R, 428 C, 841

[56] References Cited

U.S. PATENT DOCUMENTS

| | | | |
|---|---|---|---|
| 2,721,743 | 10/1955 | Erikson et al. | 360/109 |
| 2,864,892 | 12/1958 | Perkins | 360/109 |
| 3,310,791 | 3/1967 | Fischer | 360/109 |
| 3,502,820 | 3/1970 | Zenz | 360/109 |
| 3,744,804 | 7/1973 | Kudelski | 360/109 |
| 3,761,644 | 9/1973 | Camras | 360/109 |
| 3,900,888 | 8/1975 | Uchikoshi et al. | 360/76 |

Primary Examiner—Alfred H. Eddleman
Attorney, Agent, or Firm—Pearne, Gordon, Sessions, McCoy & Granger

[57] ABSTRACT

This invention relates to head adjustment means for a tape recorder. The head adjustment means comprises a pair of adjusting screws having the same pitch to threadedly extend through said base plate, respectively, and to engage said head mounting plate at two points spaced from each other in a plane in which a gap of said magnetic head is contained and which plane is perpendicular to a running plane of said magnetic tape whereby independent rotation of each of said adjusting screws adjusts the tilt of said magnetic head relative to a surface of said magnetic tape and a connecting member to be selectively connected with both of said adjusting screws so as to cause said screws to rotate at the same time and at the same rate of rotation whereby their associated rotation adjusts a vertical position of said magnetic head without varying the tilt attitude of said magnetic head.

9 Claims, 3 Drawing Figures

HEAD ADJUSTMENT MEANS FOR A TAPE RECORDER

BACKGROUND OF THE INVENTION

In order to record a signal on a magnetic tape by a magnetic head and/or to reproduce the signal from the magnetic tape by the magnetic head in a tape recorder, it has been required that the magnetic head uniformly contacts the magnetic tape while a gap of the magnetic head is properly positioned relative to a given track of the magnetic tape. To this end, the tape recorder is usually provided with adjusting means to adjust the tilt of the magnetic head relative to a surface of the magnetic tape and the vertical position of the magnetic head in the direction of the width of the magnetic tape. However, in prior tape recorders, for example, a pair of adjusting screws have been used in adjustment of the tilt as well as adjustment of the vertical position. In such case, one of these screws has been rotated independently of the other for both adjustments, so that the adjustments are very difficult and so that one of the adjustments affects the other. Also, another adjusting screw has been provided separate from the tilt adjusting screws. Thus, it will be understood that assembly and adjustment of the head adjustment means are troublesome because it has many components. Furthermore, this causes the construction to be complicated and, therefore, the cost to be expensive.

SUMMARY OF THE INVENTION

Accordingly, it is a principal object of the invention to provide head adjusting means for a tape recorder adapted to prevent an adjustment of the vertical position of a magnetic head from adversely affecting an adjustment of the tilt of the magnetic head.

It is another object of the invention to provide head adjusting means for a tape recorder adapted to properly position a magnetic head relative to a magnetic tape in an easier manner and with a simpler construction.

In accordance with the invention, there is provided head adjusting means for a tape recorder wherein a head mounting plate mounting a magnetic head thereon is movably supported relative to a base plate so that said magnetic head is properly positioned relative to a magnetic tape comprising a pair of adjusting screws having the same pitch to threadedly extend through said base plate, respectively, and to engage said head mounting plate at two points spaced from each other in a plane in which a gap of said magnetic head is contained and which plane is perpendicular to a running plane of said magnetic tape whereby independent rotation of each of said adjusting screws adjusts the tilt of said magnetic head relative to a surface of said magnetic tape and a connecting member to be selectively connected with both of said adjusting screws so as to cause said screws to rotate at the same time and at the same rate of rotation whereby their associated rotation adjusts a vertical position of said magnetic head without varying the tilt attitude of said magnetic head.

BRIEF DESCRIPTION OF THE DRAWING

The above and other objects and features of the invention will be apparent from the description of the embodiment of the invention taken with reference to the accompanying drawing in which.

DETAILED DESCRIPTION OF THE EMBODIMENT

Figure 1:
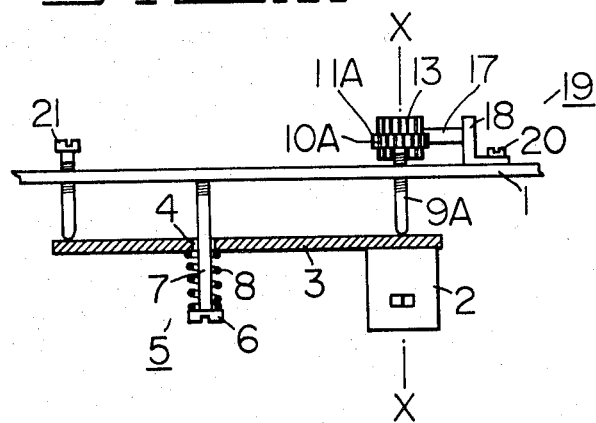
FIG. 1 is an elevational view of head adjusting means of the invention with a portion taken in section.
Figure 2:
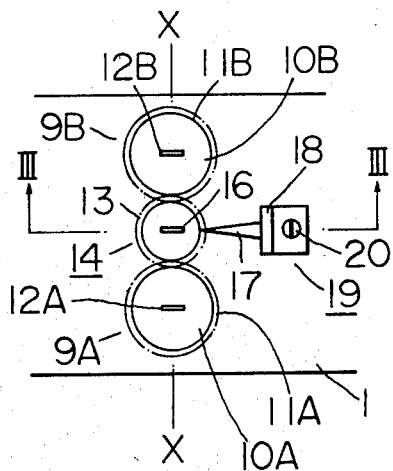
FIG. 2 is a plan view of adjusting screws associated with a connecting member.
Figure 3:
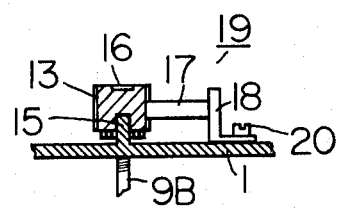
FIG. 3 is a cross sectional view of the connecting member taken along the line III—III of FIG. 2.

Referring now to FIGS. 1 to 3, there is shown a base plate 1 below which is disposed a head mounting plate 3 having a magnetic head 2 securely mounted on the plate 3 at its one end. A bolt 5 has a rod portion 7 loosely extending through a hole 4 in the head mounting plate 3 and threadedly engages with the base plate 1 so that the head mounting plate 3 is movably supported on the base plate 1. A coil spring 8 is disposed around the rod portion 7 of the bolt 5 and at both ends thereof engages the head mounting plate 3 and the head portion 6 of the bolt 5, respectively, so that the head mounting plate 3 is urged in an upward direction or toward the base plate 1.

A pair of adjusting screws 9A and 9B having the same pitch are disposed in a spaced manner on the base plate 1 in a plane in which a gap of the magnetic head 2 is contained and defined by the line X—X of FIGS. 1 and 2, and which plane is perpendicular to a running plane of a magnetic tape (not shown) and threadedly extends therethrough, so that the adjusting screws A and B contact the head mounting plate 3 at two points spaced from each other in the plane defined by the line X—X. The adjusting screws 9A and 9B have head portions 10A and 10B provided with engagement portions 11A and 11B of gears having the same pitch and same number of teeth, and at their upper faces are provided with grooves 12A and 12B which serve to engage a rotating tool such as a screw driver to rotate the adjusting screws 9A and 9B, respectively.

A connecting means or member 14 is provided with an engagement portion 13 of gear having the same pitch as those of the engagement portions 11A and 11B of the adjusting screws 9A and 9B, the number of teeth being less than that of the engagement portions 11A and 11B and the axial length larger than those of the engagement portions 11A and 11B. As shown in FIG. 3, the connecting member 14 is rotatably supported on a cylindrical projection 15 integrally provided on the base plate 1. The connecting member 14 at its upper face has a groove 16 which serves to engage a rotating tool to rotate the connecting member 14. The engagement portion 13 of the connecting member 14, when supported on the cylindrical projection 15, meshes with the engagement portions 11A and 11B of the adjusting screws 9A and 9B so as to cause these screws to rotate at the same time and rate of rotation in the same direction.

Locking means 19 comprises a tapered locking piece 17 of resilient material such as synthetic resin engaging a toothed groove of the engagement portion 13 to prohibit it from free rotation and an L-shaped supporting member 18 securely mounted on the base plate 1 by a screw 20. Thus, the screws 9A and 9B and the connecting member 14 are locked at an adjusted position.

A screw 21 threadedly extends through the base plate 1 and at its end engages the other end of the head mounting plate 3.

In adjusting the magnetic head 2 relative to the magnetic tape, not shown, firstly the connecting member 14 is removed from the cylindrical portion 15 on the base plate 1. After that, the adjusting screws 9A and 9B are separately by the rotating tool at any angle so that the tilt of the magnetic head 2 is adjusted relative to the surface of the magnetic tape. Thereafter, the connecting member 14 is replaced on the cylindrical portion 15 on the base plate so that it engages the adjusting screws 9A and 9B. Thus, the adjusting screws 9A and 9B can no longer be rotated in a separate manner. This allows the magnetic head 2 to be fixed at an optimum alignment or tilt adjustment to the surface of the magnetic tape. The rotation of the connecting member 14 enables the magnetic head 2 to be adjusted in its vertical position without any change in the tilt attitude of the magnetic head 2 because the adjusting screws 9A and 9B are rotated at the same pitch in the same direction. It will be noted that the locking piece 17 is resiliently deformed to be disengaged from the space between the teeth of the engagement portion 13 of the connecting member 14 during adjustment of the vertical position of the head 2, but that the locking piece 17 engages the engagement portion 13 of the connecting member 14 after adjustment of the vertical position of the magnetic head 2. This prevents the connecting member 14 from its free rotation. Finally, the screw 21 is rotated to adjust the azimuth of the magnetic head 2. This adjustment of the azimuth is conventional, and therefore it will not be described in detail.

Since it may be of concern that the adjusting screws 9A and 9B and the connecting member 14 will be angularly moved when the connecting member 14 engages the adjusting screws 9A and 9B or when the locking piece 17 locks the connecting member 14 after adjustment of the vertical position of the magnetic head 2, it will be noted that the pitch and the number of teeth of the engagement portions 11A and 11B of the adjusting screws 9A and 9B are preferably determined so that such an angular movement of the components is negligible.

Since the number of teeth of the engagement portion 13 of the connecting member 14 is less than those of the engagement portions 11A and 11B of the adjusting screws 9A and 9B, it will be noted that level of the magnetic head 2 can be adjusted with precision in accordance with the ratio of rotation of the adjusting screws 9A and 9B to the connecting member 14.

Although one preferred embodiment of the invention has been described and illustrated with reference to the accompanying drawing, it will be understood that this is by way of example, and that various changes and modifications may be made without departing from the spirit and scope of the invention. For example, although, in the embodiment, the adjusting screws 9A and 9B engage the connecting member 14 by means of an idler gear, they may be frictionally engaged with each other with frictional means such as a rubber belt. Also, the magnetic head 2 may be movably mounted on the base plate 1 by another suitable means without any use of the head mounting plate 3. It should be noted that the invention is intended to be defined only by the appended claims.

What is claimed is:

1. Head adjustment means for a tape recorder having a base plate and a magnetic head comprising:
   a pair of adjusting screws having the same pitch and disposed in a plane substantially corresponding to a gap defining plane of a magnetic head and threadedly acting between said magnetic head and the base plate,
   the separate rotation of said adjusting screws adjusting the tilt of said magnetic head relative to the surface of a magnetic tape which is to engage said magnetic head; and
   connecting means having an engagement portion removably engaged with engagement portions of said adjusting screws to adjust the vertical position of said magnetic head relative to said magnetic tape by the simultaneous rotation of said adjusting screws by said connecting means.

2. Head adjustment means for a tape recorder as set forth in claim 1, wherein said engagement portions of said adjusting screws are formed of gears having the same pitch and number of teeth while said engagement portion of said connecting means is formed of an idler gear having the same pitch as those of said engagement portions of said adjusting screws.

3. Head adjustment means for a tape recorder as set forth in claim 1, and further comprising locking means to inhibit free rotation of said adjusting screws.

4. Head adjustment means for a tape recorder as set forth in claim 3, wherein said locking means comprises a locking piece of resilient material securely engaged with said engagement portion of said connecting means, but resiliently deformable to permit said connecting means to be rotated.

5. Head adjustment means for a tape recorder as set forth in claim 2, wherein said idler gear has a lesser number of teeth than the teeth on said adjusting screws.

6. Head adjusting means for a tape recorder wherein a head mounting plate mounting a magnetic head thereon is movably supported relative to a base plate so that said magnetic head is properly positioned relative to a magnetic tape, comprising:
   a pair of adjusting screws having the same pitch to threadedly extend through said base plate, respectively, and to engage said head mounting plate at two points spaced from each other in a plane in which a gap of said magnetic head is contained and which plane is perpendicular to a running plane of said magnetic tape whereby independent rotation of each of said adjusting screws adjusts the tilt of said magnetic head relative to a surface of said magnetic tape; and
   a connecting member to be selectively connected with both of said adjusting screws so as to cause said screws to rotate at the same time and at the same rate of rotation whereby their associated rotation adjusts a vertical position of said magnetic head without varying the tilt attitude of said magnetic head.

7. Head adjusting means for a tape recorder as set forth in claim 6, and further comprising locking means to lock said connecting member connected with said adjusting screws.

8. Head adjusting means for a tape recorder as set forth in claim 6, wherein said adjusting screws have engagement portions formed of gears having the same pitch and the same number of teeth while said connecting member has an engagement portion formed of gear having the same pitch as those of said engagement portions of said adjusting screws and fewer teeth than those of said engagement portions of said adjusting screws.

9. Head adjusting means for a tape recorder as set forth in claim 8, and further comprising locking means to lock said connecting member connected with said adjusting screws, said locking means comprising a locking piece of resilient material securely engaged with said engagement portion of said connecting member, but resiliently disengageable from said engagement portion of said connecting member when said connecting member is rotated.

* * * * *